(12) United States Patent
Ng (10) Patent No.: US 7,215,509 B2
(45) Date of Patent: May 8, 2007

(54) POP-ON DISC CLAMP FOR A DATA STORAGE DEVICE

(75) Inventor: HwaLiang Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 406 days.

(21) Appl. No.: 10/638,731

(22) Filed: Aug. 11, 2003

(65) Prior Publication Data

US 2005/0036235 A1   Feb. 17, 2005

(51) Int. Cl.
*G11B 17/022*   (2006.01)

(52) U.S. Cl. .............................. 360/99.12; 360/98.08; 29/603.03; 29/737

(58) Field of Classification Search ............. 360/98.08, 360/99.12, 99.05; 29/603.03, 603.02, 737
See application file for complete search history.

(56) References Cited

U.S. PATENT DOCUMENTS

| | | | |
|---|---|---|---|
| 4,918,545 A * | 4/1990 | Scheffel .................... | 360/98.08 |
| 5,075,808 A | 12/1991 | Johnson | |
| 5,101,306 A | 3/1992 | Johnson | |
| 5,243,481 A | 9/1993 | Dunckley | |
| 5,486,961 A | 1/1996 | Boutaghou | |
| 5,550,690 A | 8/1996 | Boutaghou | |
| 5,590,004 A | 12/1996 | Boutaghou | |
| 5,801,901 A | 9/1998 | Bryan | |
| 5,847,900 A | 12/1998 | Iwabuchi | |
| 6,417,988 B1 | 7/2002 | Renken | |
| 6,567,238 B1 * | 5/2003 | Renken et al. ........... | 360/99.12 |
| 6,757,132 B1 * | 6/2004 | Watson et al. ........... | 360/99.12 |
| 6,807,721 B2 * | 10/2004 | Choo et al. .............. | 29/603.03 |
| 6,816,338 B1 * | 11/2004 | Suwito .................... | 360/99.12 |
| 6,967,814 B1 * | 11/2005 | Chessman et al. ....... | 360/99.12 |
| 7,009,809 B2 * | 3/2006 | Hanssen ................... | 360/99.12 |
| 2002/0069509 A1 * | 6/2002 | Choo et al. .............. | 29/603.03 |

FOREIGN PATENT DOCUMENTS

| JP | 05166328 A | * | 7/1993 |
|---|---|---|---|
| JP | 06060513 A | * | 3/1994 |
| JP | 08321107 A | * | 12/1996 |
| JP | 09115216 A | * | 5/1997 |
| JP | 09265702 A | * | 10/1997 |

OTHER PUBLICATIONS

"Collapsible Disk Clamping Apparatus," Feb. 1, 1994, IBM Technical Disclosure Bulletin, vol. No. 37, Iss. No. 2A, pp. 283-284.*

* cited by examiner

*Primary Examiner*—William J Klimowicz
(74) *Attorney, Agent, or Firm*—Fellers, Snider, et al.

(57) ABSTRACT

Steps for clamping storage media to a motor hub to form a data storage device include; securing the disc clamp with a mounting tool, which subsequently expands a central mounting aperture of the disc clamp for assembly of the disc clamp to the motor hub. Upon eschewing the mounting tool from the disc clamp, the motor hub constrains the disc clamp to develop a clamp force that is imparted on the storage media by an annular rib of the disc clamp to clamp the disc to the motor hub. The disc clamp is generally disc shaped and includes a central mounting aperture and a peripheral portion that includes the annular rib extending in a radial direction from the central mounting aperture. The annular rib pressingly engages the storage media to clamp storage media to the motor hub.

18 Claims, 6 Drawing Sheets

POP-ON DISC CLAMP FOR A DATA STORAGE DEVICE

FIELD OF THE INVENTION

This invention relates generally to the field of magnetic data storage devices, and more particularly, but not by way of limitation, to a pop-on disc clamp for a data storage device.

BACKGROUND

One key component of any computer system is a device, to store data. The most basic parts of a DSD are an information storage media that is rotated, an actuator that moves a read/write head (head) to various locations over data tracks of the storage media, and electrical circuitry used for encoding data so that the data can be successfully retrieved and written to the storage media surface. A microprocessor controls most of the operations of the DSD including exchanging data between the computer system and the DSD.

Among the challenges associated with DSDs and data storage device assembly processes are cost effective techniques for clamping discs to motor hubs. A reduction in component count or process step elimination frequently yields cost savings in excess of the component purchase price savings or the direct savings from the eliminated process step. Process step elimination prevents rework costs and handling damage encountered at that step. A reduced component count means fewer components need to be ordered, tracked and controlled, thereby avoiding overhead costs associated with those components.

For example, clamp rings that are attached with fasteners are more likely to create disc damage because the fasteners can be dropped on the surface of the disc. Additionally, variations in the amount of torque applied to each fastener leads to coning of the disc, which translates to undesirable run-out. In either case (damage or coning), the result is a need to re-work the DSD, further exposing the DSD to handling damage. In this example both a reduction in component count, and an elimination of process steps (torquing the fasteners) would lead to improvements in both cost and quality of the DSD.

For another example, a DSD configured with a shrink-fit clamp ring is subject to variations in the process, which lead to disc slippage or disc coning. Additionally, special equipment is needed to apply shrink-fit clamp rings to motor hubs, and to remove shrink-fit clamps, which have been heat shrunk to motor hubs in order to re-work product found to have defective discs.

As such, challenges remain and a need persists for consistent, cost effective techniques for securing discs to motor hubs of data storage devices.

SUMMARY OF THE INVENTION

In accordance with preferred embodiments, a method, apparatus and combination are provided for clamping storage media of a data storage device to a motor hub of a spindle motor assembly of the data storage device.

In one embodiment, the disc clamp preferably has a generally disc shaped body and includes a central mounting aperture, and a peripheral portion extending in a radial direction from the central mounting aperture. Preferably the central mounting aperture is adjacent a proximal end of the peripheral portion. An annular rib is preferentially formed in the peripheral portion, which pressingly engages the storage media to clamp the storage media to the motor hub. A tool engagement region is provided at the distal end of the peripheral portion. In a preferred configuration, the annular rib is adjacent to the tool engagement region and located between the tool and data region and the central mounting aperture.

In another embodiment of the present invention, the preferred steps of the method for clamping the storage media to the motor hub include; securing the disc clamp with a retention portion of a mounting tool; expanding a disc clamp central mounting aperture with a deflection portion of the mounting tool; aligning the disc clamp central mounting aperture adjacent a retention groove of the motor hub as well as an annular rib of the disc clamp adjacent the storage media.

The preferred method steps continue with extracting the deflection portion of the mounting tool to pressingly engage a confinement surface of the disc clamp against a retention surface of a retention groove, which develops a clamping force that is imparted on the storage media through the annular rib. The preferred method continues with a release of the disc clamp from the mounting tool, removal of the mounting tool from the motor hub, and a conclusion of the preferred method.

These and various other features and advantages that characterize the claimed invention will be apparent upon reading the following detailed description and upon review of the associated drawings.

DETAILED DESCRIPTION

Figure 1:
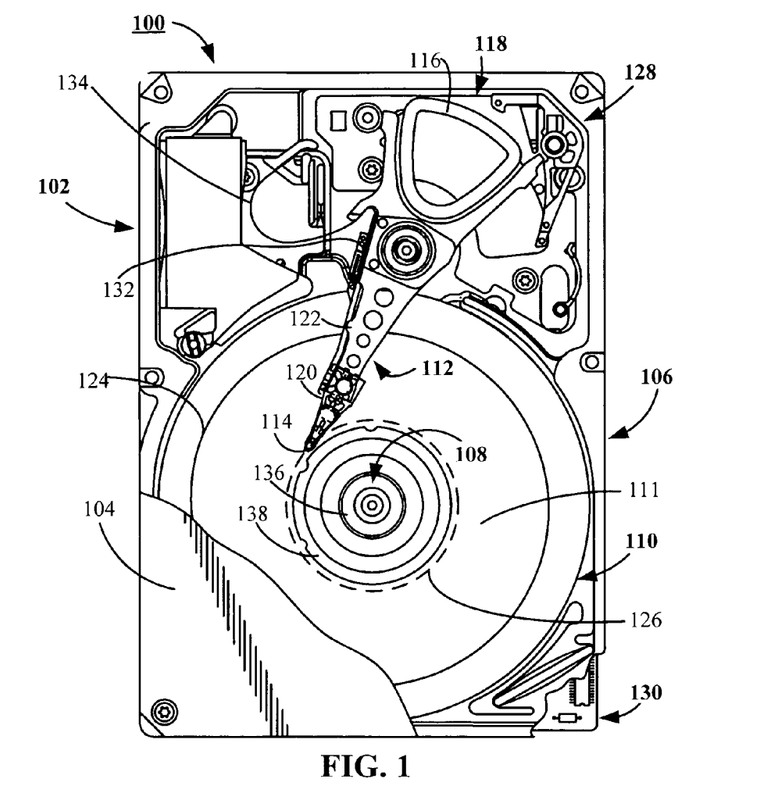
FIG. 1 is a partial cut-away top plan view of a data storage device (DSD) that incorporates a disc clamp of the preferred embodiment of the present invention.

Referring now to the drawings, FIG. 1 provides a top plan view of a data storage device (DSD) 100. The DSD 100 includes a base deck 102 cooperating with a top cover 104 (shown in partial cutaway) to form a sealed housing for a mechanical portion of the DSD 100, referred to as a head-disc assembly (HDA) 106.

A spindle motor assembly (motor) 108 rotates a number of data storage discs (storage media) 110 with a magnetic recording surface (surfaces) 111 at a substantially constant operational speed. An actuator 112 supports and rotates a number of read/write heads (heads) 114 into a data exchange relationship adjacent the magnetic recording surface 111 when current is applied to a coil 116 of a voice coil motor (VCM) 118. The heads 114 are secured to a suspension 120, which is attached to an actuator arm 122 of the actuator 112. The suspension 120 assures a consistent, predetermined spring force is applied to the head 114 for proper control of the head 114 relative to the storage media 110.

During operation of the DSD 100, the actuator 112 moves the heads 114 to data tracks 124 on the surfaces 111 to write data to and read data from the storage media 110. When the DSD 100 is deactivated, the actuator 112 moves the heads to a predetermined position. For example, the actuator 112 may position the heads 114 adjacent a home position 126, and utilize a toggle latch 128 to constrain motion of the actuator 112. However, alternative means for restraining the actuator 112 may be employed, for example, a ramp load/unload mechanism (not shown) may be incorporated to constrain movement of the actuator 112 during periods of inactivity of the DSD 100.

Command, control and interface electronics for the DSD 100 are provided on a printed circuit board assembly 130 mounted to the HDA 106. During data transfer operations, a preamplifier/driver 132 attached to a flex circuit 134 conditions read/write signals conducted by the flex circuit 134 between the printed circuit board assembly 130 and the heads 114.

In a preferred embodiment, the storage media 110 is clamped by a single member disc clamp 136 adjacent a motor hub 138 of the motor 108. The disc clamp 136 develops a clamp force between the storage media 110, and the motor hub 138 to assure the storage media 110 remains in a fixed position, while the motor 108 rotates the motor hub 138 during operation of the DSD 100. Preferably, the disc clamp 136 is configured as a single piece, stamped disc clamp as illustrated in FIGS. 2 & 3.

Figure 2:
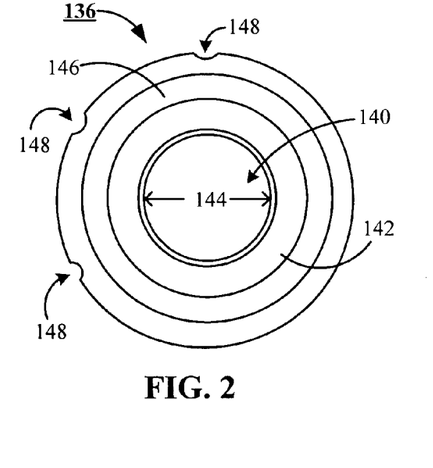
FIG. 2 is a top plan view of the disc clamp of FIG. 1.
Figure 3:
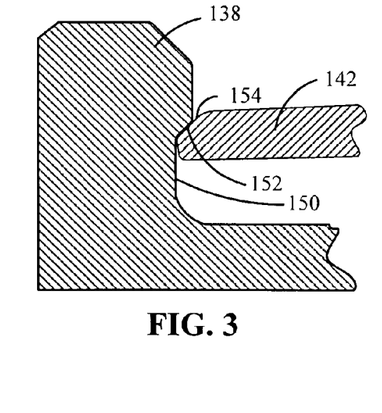
FIG. 3 is a partial cut-away, cross-sectional elevational view of a motor hub and disc clamp of FIG. 1.

FIG. 2 shows a preferred embodiment of a low cost, single piece, self centering stamped component (disc clamp 136) providing the clamp force used to clamp the storage media 110 to the motor hub 138. Because of the preferred design of the disc clamp, component count of the DSD 100 (of FIG. 1) is reduced, and no additional components are needed for a preferred installation of the disc clamp 136, which eliminates process steps and reduces handling damage resulting in reduced instances of re-work and re-work costs. Absence of a need for fasteners to install the disc clamp 136, leads to a direct reduction in particulate generation during the assembly process of the HDA 106 (of FIG. 1). While the self centering attribute of the disc clamp 136 reduces an amount of imbalance present in the HDA 106.

As will readily be seen during the discussion of FIGS. 7-12, simplicity of a preferred design of the disc clamp 136 facilitates a low cost, highly reliable mounting tool, for use in mounting and dismounting the disc clamp 136 from the motor hub 138, which reduces machine downtime and maintenance cost while enhancing automated assembly of the HDA 106.

The disc clamp 136 features include; a generally disc shaped body including a central mounting aperture 140, and a peripheral portion 142 extending radially from the mounting aperture 140. During an assembly operation, an inner diameter 144 of the peripheral portion 142 expands upon mechanical deflection, from a free state to enlarge the mounting aperture 140 for passage by an outside diameter (not shown) of the motor hub 138 (of FIG. 1).

The mechanical deflection develops a leaf spring load. Upon release of the mechanical deflection, the peripheral portion 142 of the disc clamp 136 is restrained by the motor hub 138 and precluded from returning to its free, non-deflected state. The prevention of the peripheral portion 142 from returning to its free state develops a clamping force, which is translated to the storage media 110 (of FIG. 1) by an annular rib 146 formed in the peripheral portion 142.

FIG. 2 further shows a balance compensation notch 148 incorporated in a preferred embodiment of the present invention, which is optionally formed in the disc clamp 136 during the assembly process of the HDA 106 (of FIG. 1). For example, during a balance operation, if the motor hub 138, storage media 110, and disc clamp 136 of the HDA 106 meets a predetermined balance tolerance criterion, no material would need to be removed from the disc clamp 136 to offset the imbalance. For those instances of imbalance, the balance compensation notch 148 or notches 148 are used to bring the HDA 106 within the proscribed balance tolerance criteria.

FIG. 3 shows the motor hub 138 includes a retention groove 150 with a retention surface 152, which communicates with a continuous annular confinement surface 154 of the peripheral portion 142 of the disc clamp 136 (of FIG. 2). The confinement surface 154 circumscribes the central mounting aperture 140 (of FIG. 2), and upon engagement of the confinement surface 154 by the retention surface 152 the disc clamp 136 is prevented from moving away from the motor hub 138.

Figure 4:
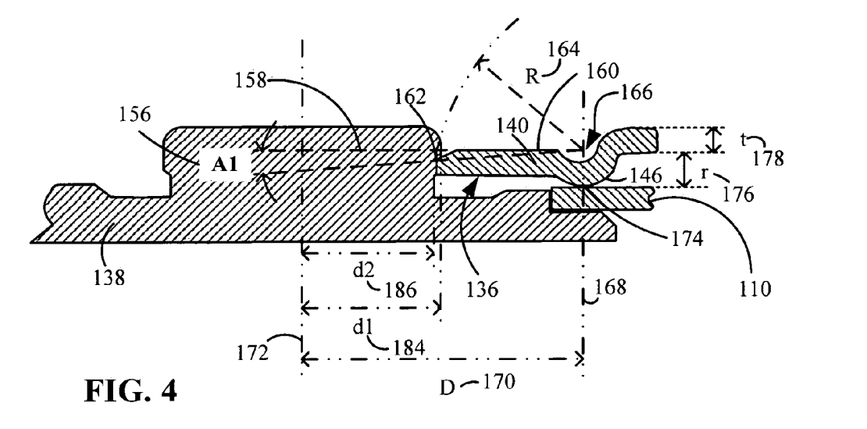
FIG. 4 is a cut-away, partial cross-sectional elevational view showing dimensional relationships between the motor hub and the disc clamp of FIG. 1.
Figure 5:
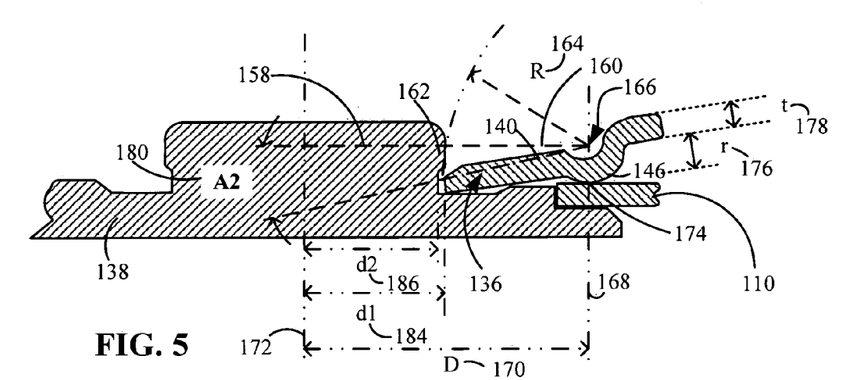
FIG. 5 is a cut-away, partial cross-sectional elevational view showing further dimensional relationships between the motor hub and the disc clamp of FIG. 1.
Figure 6:
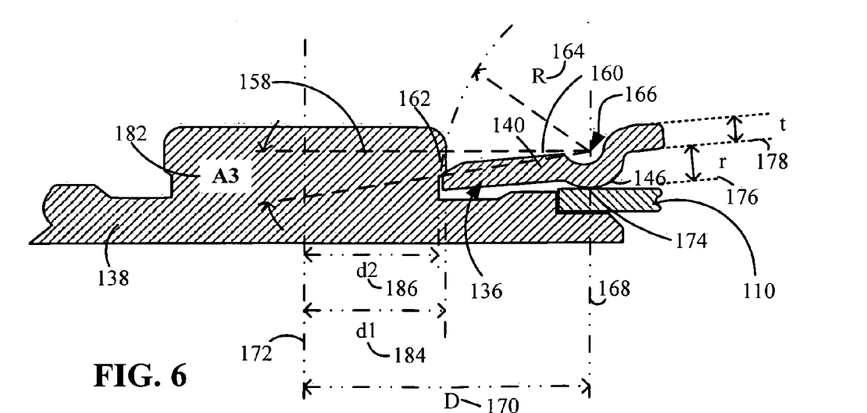
FIG. 6 is a cut-away, partial cross-sectional elevational view showing still further dimensional relationships between the motor hub and the disc clamp of FIG. 1.

FIGS. 4–6, may be more beneficially viewed collectively to obtain an enhanced understanding of the geometric and structural relationships of the disc clamp 136. Upon review of the geometric and structural relationships of the disc clamp 136 shown by FIGS. 4–6, an ability to "tune" a desired clamp force delivered by the disc clamp 136 will be appreciated those skilled in the art as a feature of the present invention. The ability to "tune" the desired clamp force is attainable through slight alterations of the geometric and structural relationships presented by FIGS. 4–6.

The difference between each of the three illustrations is an amount of deflection present in the disc clamp 136. For example, the amount of deflection of the disc clamp 136 present in FIG. 4 is reflected by an angle A1 156. The angle A1 156 is substantially the angle between a horizontal line 158 (the horizontal line 158 coincides with a top surface 160 of the disc clamp 136, when the disc clamp 136 is in its free state) and an annular contact line 162, of the disc clamp 136.

The annular contact line 162 is a radius distance R 164 from an origin 166, and represents the locus of points of the disc clamp 136 nearest the motor hub 138, which needs to clear the motor hub 138 to allow assembly of the disc clamp 136 to the motor hub 138. The origin 166 is determined by an intersection of a line 168, a distance D 170 from a rotational axis 172 of the motor hub 138, and perpendicular to the horizontal line 158. The distance D 170 is the distance between the rotational axis 172 of the motor hub 138, and a disc interface line 174 of the annular rib 146.

The disc interface line 174 represents the locus of points of the annular rib 146 adjacent the storage media 110. The disc interface line 174 is determined by an intersection of the line 168 with a radial distance r 176 from the origin 166, which is also the distance the storage media 110 is from the origin 166. The radial distance r 176 in conjunction with a thickness t 178 of the disc clamp 136, are two of the variables used in tuning a desired clamping force imparted by the disc clamp 136 on the storage media 110.

The amount of deflection of the disc clamp 136 present in FIG. 5 is reflected by an angle A2 180. The angle A2 180 illustrates a maximum deflection the disc clamp 136 undergoes for clearance between the annular contact line 162, and the motor hub 138 during assembly of the disc clamp 136 to the motor hub 138.

The amount of deflection of the disc clamp 136 present in FIG. 6 is reflected by a clamp deflection angle A3 182. The clamp deflection angle A3 182 illustrates a deflection remaining in the disc clamp 136 upon completion of the assembly of the disc clamp 136 to the motor hub 138.

As will be recognized by those skilled in the art, the particular dimensional attributes of the disc clamp 136 depends directly on the dimensional characteristics of the motor hub 138. For purposes of enhancing an understanding of the present invention, and not by way of imposing limitations on the present invention, the points covered in the following discussion have been found to be helpful in practicing the present invention. Additionally, the values used in describing a preferred embodiment of the present invention are provided for illustrative purposes only, as an aid to enhance an understanding of the present invention, and fail to impose limitations on the spirit and scope of the present invention.

Useful design parameters for the present invention are illustrated by FIG. 4, FIG. 5, and FIG. 6. An important design parameter for a preferred embodiment of the disc clamp 136 is to achieve sufficient radial interference between the peripheral portion 142 of the disc clamp 136, and a maximum diameter d1 184 of the motor hub 138 to build up a desired clamping force. That is, the ability to develop sufficient clamp force while retaining an ability to deflect the peripheral portion 142, an amount sufficient to provide clearance between the annular contact line 162 and a maximum diameter d1 184 during assembly of the disc clamp 136 onto the motor hub 138.

There are 3 stages of the clamp deflection. An initial free stage, as shown by FIG. 4, in which the absence of deflection is present. As illustrated by FIG. 4, an interference between the annular contact line 162 and a maximum diameter d1 184 is present.

A fully deflected stage, as shown by FIG. 5, is a result of the peripheral portion 142 of the disc clamp 136 being deflected by a mounting tool (not shown), to change the deflection angle A1 156 (of FIG. 4) to the deflection angle A2 180. As illustrated by FIG. 5, an enlargement of the mounting aperture 140 (of FIG. 2), via the deflection of the peripheral portion 142, provides clearance between the annular contact line 162, and the maximum diameter d1 184 of the motor hub 138, for passage of the disc clamp 136 over the motor hub 138.

A released clamp stage, as shown by FIG. 6, is a result of the peripheral portion 142 of the disc clamp 136 being released from the influence of the deflection portion of the mounting tool, to change from the deflection angle A2 180 (of FIG. 5) to the clamp deflection angle A3 182. As illustrated by FIG. 6, interference between retention surface 152 of the retention groove 150 (of FIG. 3) and the confinement surface 154 of the peripheral portion 142 (of FIG. 3) prohibits return of the peripheral portion 142 to its free state as shown by FIG. 4. The prohibition of the return of the peripheral portion 142 to its free state develops a leaf spring force in the disc clamp 136, which is imparted by the annular rib 146 at the disc interface line 174.

The difference between the clamp deflection angle A3 182 and the deflection angle A1 156 determines the leaf spring force built into the design of the disc clamp 136. The difference between the deflection angle A2 180 and the deflection angle A1 156, determines the amount of deflection force needed by the deflection portion of the mounting tool.

Important design constraints to consider when practicing the present invention include; a thickness t 178 of the disc clamp 136, a radial distance r 176 that the disc interface line 174 lies from the origin 166, and distance D 170 between the rotational axis 172 of the motor hub 138 and the disc interface line 174.

By way of illustrating a preferred embodiment of the present invention through a presentation of useful design optimization guidelines, but not by way of imposing limitations on the spirit or scope of the present invention, the angles described here-in-below are expressed in degrees and the linear dimensions are expressed in inches.

In optimizing the design of the preferred embodiment of the disc clamp 136 to prevent shifting of the annular rib 146, it has been found useful to maximize the radius distance R 164 from an origin 166 to the annular contact line 162, maximize the clamp deflection angle A3 182, maximize the difference between the maximum deflection angle A2 180 and the clamp deflection angle A3 182, and minimize the radial distance r 176. It has been found that shifts in the annular rib 146 relative to the storage media 110 effects disc coning.

For a given radius distance R 164, minimizing both the maximum diameter d1 184 of the motor hub 138, and a maximum diameter d2 186 of the retention groove 150 (of FIG. 3) is useful, keeping in mind that at the maximum deflection angle A2 180 the yield point of the disc clamp 136 material should not be attained. Also, ensuring at clamp deflection angle A3 182 the retention surface 152 and the confinement surface 154 maintain an interference of preferably 0.005 in. To assure the clamp force meets the desired specification, the thickness t 178 of the disc clamp 136, and the radial distance r 176, are preferably manipulated with the aid of a computer model to achieve the desired clamp force.

Additional design optimization guidelines found useful include; ensuring that diameter d2 186 of the retention groove 150 is optimized to control the self-centering movement of the disc clamp 136, preferably a radial clearance of substantially 0.001 in., results between the mounting aperture 140, and the retention groove 150, at clamp deflection angle A3 182. Also, ensuring that the maximum diameter d1 184 of the motor hub 138 is optimized to give sufficient clearance, for free entry of the disc clamp 136 at the maximum deflection angle A2 180, in addition to a clearance to accommodate an operating tolerance, for the mounting tool operating under robotic control has been found to be useful. A convenient tolerance found to accommodate the operating tolerance of the mounting tool under robotic control is substantially a 0.0015 in., radial clearance.

FIGS. 7–12 illustrate a preferred embodiment mounting tool 188 that includes a deflection portion 190 and a retention portion 192. The mounting tool 188 operates along a Y axis 194 to position the disc clamp 136 relative to the motor hub 138. Additionally, the deflection portion 190 operates along the Y axis 194 independently from operation of the mounting tool 188 in the Y axis 194. Independent operation of the deflection portion 190 and Y axis 194 facilitates deflection of the peripheral portion 142 (of FIG. 2), resulting from the deflection force imparted upon the peripheral portion 142 by the deflection portion 190.

The retention portion 192 operates along an X axis 196 to either retain or release the disc clamp 136 from the mounting tool 188. The retention portion 192 cooperates with a tool engagement region 198 of the disc clamp 136. The tool engagement region 198 is located on a distal end 200 of the peripheral portion 142 and adjacent the annular rib 146. The annular rib 146 is disposed between the confinement surface 154 and the tool engagement region 198.

Figure 7:
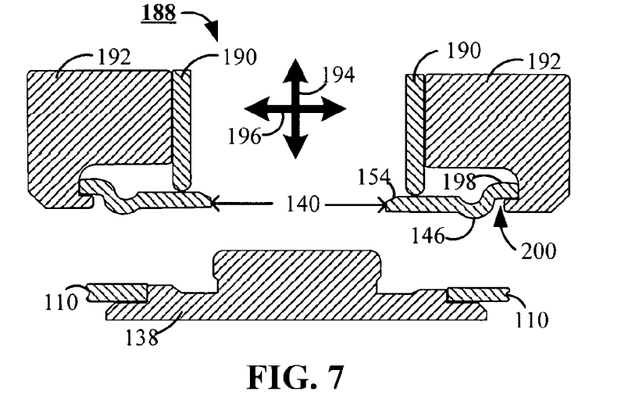
FIG. 7 is a cut-away, partial cross-sectional elevational view showing a mounting tool for mounting the disc clamp to the motor hub, each of FIG. 1.

The retention portion 192 of the mounting tool 188 holds the tool engagement region 198 of the disc clamp 136 in a fixed position, while the deflection portion 190 of the mounting tool 188 applies a deflection force to the peripheral portion 142, to enlarge the mounting aperture 140 of the disc clamp 136 as shown in FIG. 7.

Figure 8:
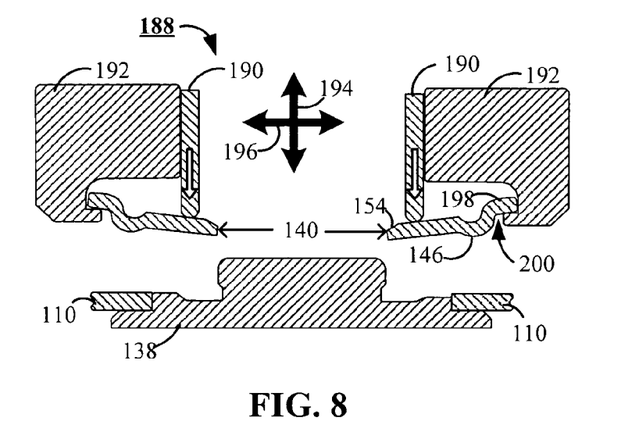
FIG. 8 is a cut-away, partial cross-sectional elevational view showing the mounting tool deflecting the disc clamp for mounting on the motor hub of the data storage device of FIG. 1.
Figure 9:
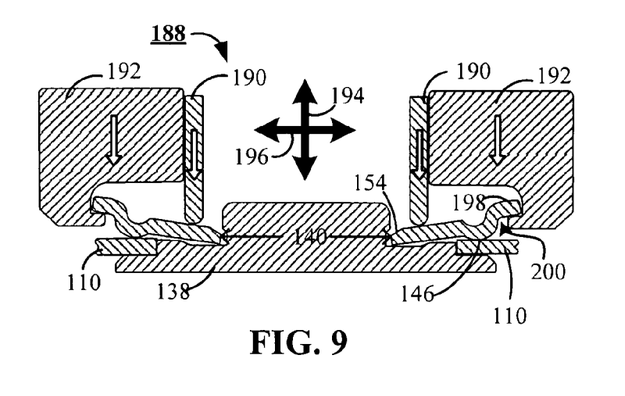
FIG. 9 is a cut-away, partial cross-sectional elevational view showing the mounting tool positioning the disc clamp adjacent the motor hub of the data storage device of FIG. 1.

FIG. 7 shows the mounting tool 188 in a raised position relative to the motor hub 138 and the disc clamp 136 in its free state. FIG. 8 shows the mounting tool 188 in a raised position, the disc clamp 136 in the maximum deflection angle A2 180 (of FIG. 5), in response to a deflection force imparted on the peripheral portion 142 by the deflection portion 190 of the mounting tool 188. FIG. 9 shows the mounting tool 188 in a lower position and having positioned the annular rib 146 adjacent the storage media 110. It is noted that the motor hub 138 is supported by a spring-load which accommodates placement of the annular rib 146 adjacent the storage media 110 by the mounting tool 188, absent damage to either the disc clamp 136 or the storage media 110.

Figure 10:
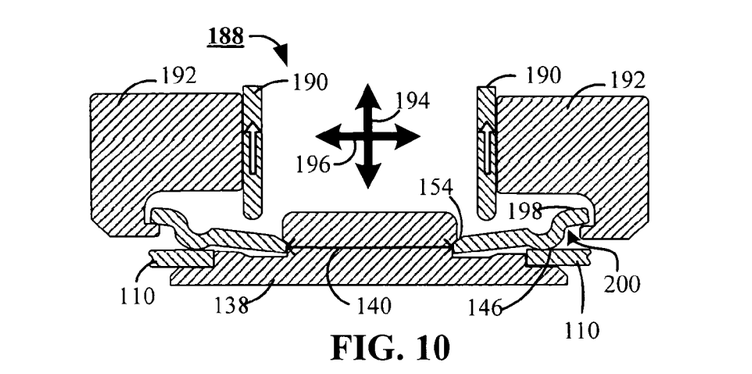
FIG. 10 is a cut-away, partial cross-sectional elevational view showing the mounting tool releasing a peripheral portion of the disc clamp to develop a clamping force to clamp the storage media adjacent the motor hub of the data storage device of FIG. 1.

FIG. 10 shows removal of the deflection portion 190 of the mounting tool 188 to allow the confinement surface 154 of the disc clamp 136 to pressingly engage the retention surface 152 of the retention groove 150 (of FIG. 3). Upon release of the deflection portion 190 of the mounting tool 188 the peripheral portion 142 of the disc clamp 136 is restrained by the motor hub 138 and precluded from returning to its free state. The prevention of the peripheral portion 142 from returning to its free state develops a clamping force which is translated to the storage media 110 by the annular rib 146 formed in the peripheral portion 142.

Figure 11:
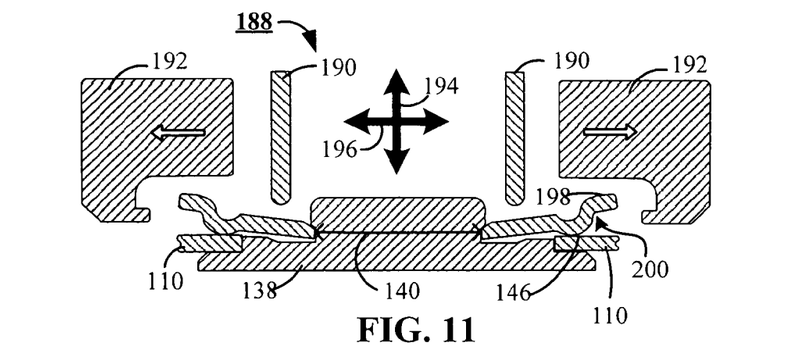
FIG. 11 is a cut-away, partial cross-sectional elevational view showing the mounting tool releasing the disc clamp of the data storage device of FIG. 1.
Figure 12:
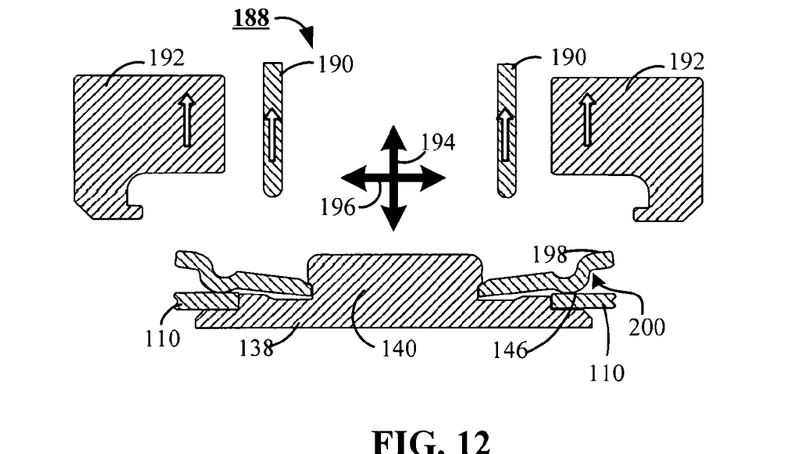
FIG. 12 is a cut-away, partial cross-sectional elevational view showing removal of the mounting tool from adjacent the disc clamp of the data storage device of FIG. 1.

FIG. 11 shows the release of the disc clamp 136 by the retention portion 192 of the mounting tool 188, while FIG. 12 shows retraction of the mounting tool 188 from the disc clamp 136.

Figure 13:
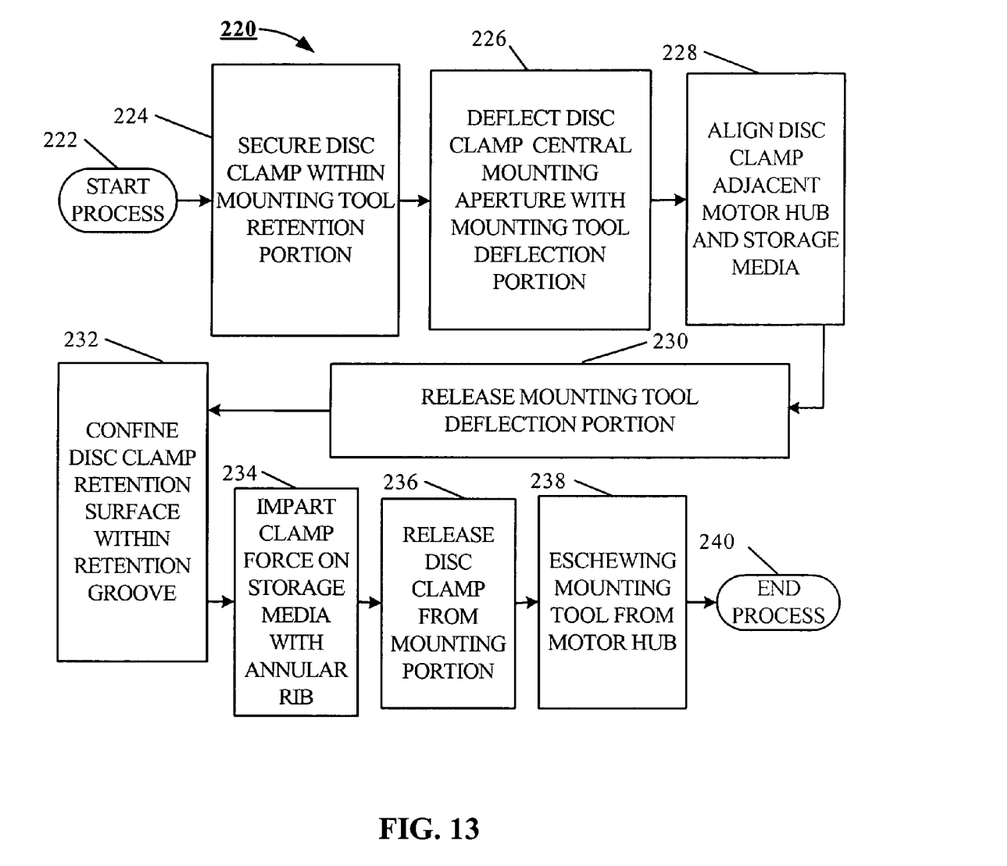
FIG. 13 is a flowchart of a method of clamping the storage media to the motor hub of the data storage device of FIG. 1.

FIG. 13 shows a clamping process 220 for clamping a storage media (such as 110) to a motor hub (such as 138) starting at start process step 222, and progressing to process step 224 with a mounting tool (such as 188) securing a disc clamp (such as 136) within a retention portion (such as 192) of the mounting tool. At this point in the process, the disc clamp is in a free state (such as shown by FIG. 7).

At process step 226, the mounting tool positions the disc clamp relative to the motor hub, and a deflection portion (such as the 190) of the mounting tool imparts a deflection force on a peripheral portion (such as 142) of the disc clamp to enlarge the mounting aperture (such as 140) of the disc clamp (such as shown by FIG. 8), to facilitate assembly of the disc clamp onto the motor hub.

At process step 228 the mounting tool aligns the disc clamp adjacent the motor hub and a storage media (such as 110) supported by the motor hub (such as shown by FIG. 9). At process step 230 the deflection portion of the mounting tool is retracted from contact with the disc clamp (such as shown by FIG. 10), and the confinement surface (such as 154) pressingly engages the motor hub which develops a clamping force to secure the storage media adjacent the motor hub.

At process step 232 the confinement surface of the disc clamp communicates with the retention surface (such as 152) of the retention groove (such as 150) to restrict displacement of the disc clamp from the motor hub. At process step 234 the clamping force developed at process step 230 is translated to the storage media through the annular rib (such as 146) at the disc interface line (such as 174) of the annular rib to clamp the storage media to the motor hub.

At process step 236, the disc clamp is released from the mounting tool (such as shown by FIG. 11), at process step 238, the mounting tool is eschewed from the disc clamp, and at end process step 240, the clamping process 220 concludes.

Figure 14:
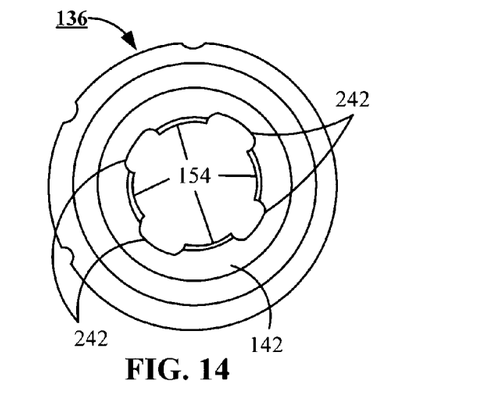
FIG. 14 is a top plan view of an alternate preferred embodiment of the disc clamp of FIG. 1.

FIG. 14 shows an alternate preferred embodiment of the disc clamp 136, which includes a plurality of relief cut-offs 242. The relief cut-offs 242 (i.e., material removed from the peripheral portion 142) have been found to be useful in "tuning" the desired clamp force to be delivered by the disc clamp 136. The size and configuration of the relief cut-offs 242 will depend on the type of material selected for use in forming the disc clamp 136, and the thickness of the selected material. In a preferred embodiment, alloys selected from series 300 stainless steel have been found to be useful, as well as alloys selected from series 400 stainless steel.

Figure 15:
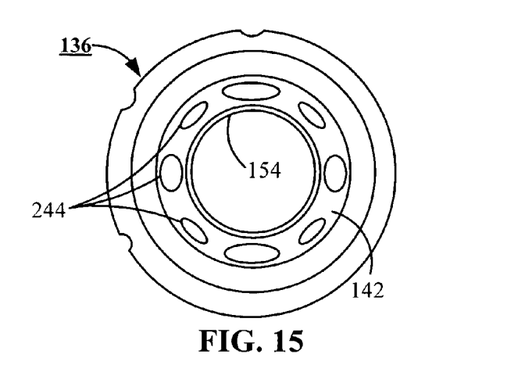
FIG. 15 is a top plan view of an additional alternate preferred embodiment of the disc clamp of FIG. 1.

FIG. 15 shows a further alternate preferred embodiment of a disc clamp 136, which includes a plurality of tuning apertures 244. The tuning apertures 244 have been found to be useful in "tuning" the desired clamp force to be delivered by the disc clamp 136. The size and configuration of the tuning apertures 244 will depend on the type and thickness of material selected for use in forming the disc clamp 136.

As will be appreciated by those skilled in the art, the amount of material present in the peripheral portion 142 to be flexed, has a direct bearing on the amount of clamp force that can be developed by the disc clamp 136. By designing the disc clamp 136 to impart a maximum clamp force, a desired clamp force below the maximum clamp force may be attained by removing material from the peripheral portion 142. By removing material from the peripheral portion 142, the peripheral portion 142 becomes less rigid, thereby reducing the ability of the disc clamp 136 to impart a maximum clamp force. As such, the peripheral portion 142 is "tunable" to a desired clamp force.

Figure 16:
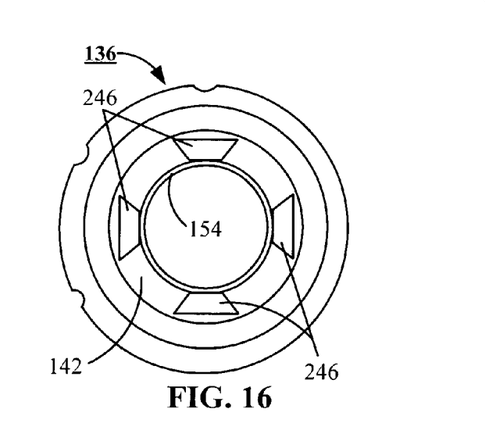
FIG. 16 is a top plan view of a further additional alternate preferred embodiment of the disc clamp of FIG. 1.

FIG. 16 shows an additional alternate preferred embodiment of a disc clamp 136, which includes a plurality of etched tuning regions 246. The etched tuning regions 246 have been found to be useful in "tuning" the desired clamp force to be delivered by the disc clamp 136. The size and configuration of the etched tuning regions 246 will depend on the type and thickness of material selected for use in forming the disc clamp 136. Again, by determining the amount of desired clamp force to be provided by the disc clamp 136, the amount of material to be removed from the peripheral portion 142 is readily determined, allowing the disc clamp to be "tuned" to its environment.

Figure 17:
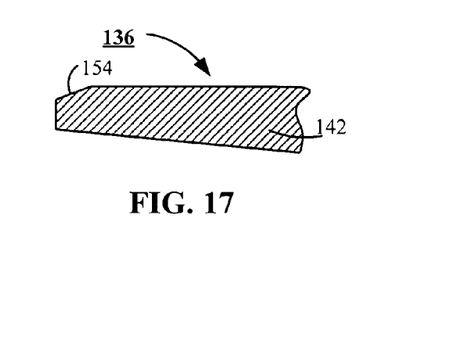
FIG. 17 is a partial cut-away, cross-sectional elevational view of the peripheral portion of the disc clamp showing a still further additional alternate preferred embodiment of the disc clamp of FIG. 1.

FIG. 17 shows another alternate preferred embodiment of a disc clamp 136, in which the peripheral portion 142 of the disc clamp 136 has been tapered via the coining operation. Tapering of the peripheral portion 142 has been found useful as a means of removing material from the peripheral portion 142, to "tune" the disc clamp 136 to attain a desired clamp force. The amount of taper imparted on the peripheral portion 142 of the disc clamp 136 to attain the desired clamp and deflection force will depend on the type and thickness of material selected for use in forming the disc clamp 136.

Accordingly, in preferred embodiments, the present invention is directed to a disc clamp (such as 136), a method (such as 220) of clamping a storage media (such as 110) to a motor hub (such as 138), and a data storage device (such as 100) that includes a motor assembly (such as 108) rotating the motor hub upon which the storage media is clamped. The storage media is clamped to the motor hub to facilitate a data exchange relationship with a read/write head (such as 114), to the motor hub by steps for clamping the storage media to the motor hub.

The disc clamp has a generally disc shaped body and includes a central mounting aperture (such as 140), and a peripheral portion (such as 142) extending in a radial direction from the central mounting aperture. The central mounting aperture is adjacent a proximal end of the peripheral portion. An annular rib (such as 146) formed in the peripheral portion pressingly engages the storage media to clamp storage media to the motor hub. A tool engagement region (such as 198) is provided at the distal end of the peripheral portion. The annular rib is adjacent to the tool engagement region and located between the tool and data region and the central mounting aperture.

The preferred steps of a method (such as 220) for clamping the storage media to the motor hub include: securing the disc clamp with a retention portion (such as 192) of a mounting tool (such as 188) (such as by process step 224); expanding a disc clamp central mounting aperture (such as 140) with a deflection portion (such as 190) of the mounting tool (such as by process step 226); aligning the disc clamp central mounting aperture adjacent a retention groove (such as 150) of the motor hub; as well as an annular rib (such as 146) of the disc clamp adjacent the storage media (such as by process step 228).

The preferred method steps continue with extracting the deflection portion of the mounting tool (such as by process step 230) to pressingly engage a confinement surface (such as 154) of the disc clamp adjacent a retention surface (such as 152) of a retention groove (such as 150) (such as by process step 232), which develops a clamping force that is imparted on the storage media through the annular rib (such as by process step 234). The preferred method continues with a release of the disc clamp from the mounting tool (such as by process step 236), removal of the mounting tool from the motor hub (such as by process step 238), and a conclusion of the preferred method (such as by process step 240).

It is to be understood that even though numerous characteristics and advantages of various embodiments of the present invention haven't been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the disc clamp while maintaining substantially the same functionality without departing from the scope and spirit of the present invention. In addition, although the preferred embodiment described herein is directed to a disc clamp for a data storage device, it will be appreciated by those skilled in the art that the teachings of the present invention can be applied to other systems without departing from the scope and spirit of the present invention.

What is claimed is:

1. A method of clamping a storage media to a motor hub by steps comprising:
   providing a clamp having an annular peripheral portion defining a central mounting aperture;
   expanding the disc clamp central mounting aperture through conical deflection of the peripheral portion;
   aligning the expanded disc clamp central mounting aperture adjacent a retention surface of the motor hub;
   releasing the conical deflection to pressingly engage a confinement surface of the disc clamp against the retention surface to impart a clamping force on the storage media.

2. The method of claim 1 wherein the peripheral portion defines an annular rib and wherein the releasing step is characterized by imparting the clamping force by the rib against the storage media.

3. The method of claim 2 wherein the expanding step is characterized by constraining an outer edge of the peripheral portion.

4. The method of claim 3 wherein the expanding step is characterized by deflecting an inner portion of the peripheral portion in relation to the constrained outer edge.

5. The method of claim 4 wherein the providing the clamp step is characterized by providing a non-circular central mounting aperture.

6. The method of claim 5 wherein the providing the clamp step is characterized by defining the central mounting aperture by two or more confinement surfaces separated by discontinuous openings sized for tuning the desired amount that the central mounting aperture expands in relation to a particular conical deflection.

7. The method of claim 4 wherein the providing the clamp step is characterized by providing a circular confinement surface and two or more openings in the peripheral portion for tuning the desired amount that the central mounting aperture expands in relation to a particular conical deflection.

8. The method of claim 7 wherein the providing the clamp step is characterized by disposing the openings between the central mounting aperture and the annular rib.

9. The method of claim 4 wherein the providing a clamp step is characterized by providing a tapered region in the peripheral portion adjacent the central mounting aperture.

10. The method of claim 9 wherein the providing a clamp step is characterized by coining the tapered region.

11. The method of claim 4 wherein the providing the clamp step is characterized by providing a region of reduced thickness in the peripheral portion for tuning the desired amount that the central mounting aperture expands in relation to a particular conical deflection.

12. The method of claim 11 wherein the providing the clamp step is characterized by etching the region of reduced thickness.

13. The method of claim 4 wherein the providing a clamp step is characterized by a selected material and the expanding step is characterized by conically deflecting the inner portion in relation to the outer edge within an elastic limit of the selected material.

14. The method of claim 13 wherein the providing a clamp step is characterized by selecting the material as stainless steel.

15. The method of claim 1 further comprising after the releasing step reexpanding the disc clamp central mounting aperture through conical deflection of the peripheral portion and removing the clamp from the motor hub.

16. The method of claim 15 wherein the expanding step is performed by a mounting tool having opposing retention portions that are moveable toward each other to constrain opposing sides of the clamp and a deflection portion that is moveable substantially transversely to the retention portions.

17. The method of claim 16 wherein the reexpanding step is performed by moving the retention portions toward each other to constrain opposing sides of the clamp and moving the retention portions transversely to the deflection portion.

18. The method of claim 1 characterized by the hub retention surface defining a retention groove.

* * * * *